US008402404B1

(12) United States Patent
Mehta et al.

(10) Patent No.: US 8,402,404 B1
(45) Date of Patent: Mar. 19, 2013

(54) STACKED DIE INTERCONNECT VALIDATION

(75) Inventors: Ashok Mehta, Los Gatos, CA (US);
Stanley John, Fremont, CA (US);
Kai-Yuan Ting, San Jose, CA (US);
Sandeep Kumar Goel, San Jose, CA (US); Chao-Yang Yeh, Luzhou (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/298,541

(22) Filed: Nov. 17, 2011

(51) Int. Cl.
*G06F 17/50* (2006.01)
(52) U.S. Cl. ......... 716/106; 716/104; 716/126; 716/139
(58) Field of Classification Search .................. 716/103, 716/104, 106, 126, 139
See application file for complete search history.

(56) References Cited

U.S. PATENT DOCUMENTS 6,792,579 B2 * 9/2004 Rankin ......................... 716/103

* cited by examiner

*Primary Examiner* — Thuan Do
(74) *Attorney, Agent, or Firm* — Duane Morris LLP; Steven E. Koffs

(57) ABSTRACT

A system includes an automated place and route tool to generate a layout of an integrated circuit (IC) die based on a gate level circuit description. A machine readable persistent storage medium includes a first portion encoded with a first gate-level description of first and second circuit patterns to be formed on first and second IC dies, respectively, and a second portion encoded with a second gate level description of the plurality of circuit patterns received from the tool. The second gate level description includes power and ground ports, and the first gate level description does not include power and ground ports. A processor-implemented verification module is provided for comparing the first and second gate level descriptions and outputting an error report if the second gate level description has an error. The verification module outputs a verified second gate-level description of the first and second circuit patterns.

20 Claims, 10 Drawing Sheets

US 8,402,404 B1

STACKED DIE INTERCONNECT VALIDATION

FIELD

This disclosure relates to semiconductor fabrication generally, and more specifically to automated electronic design automation tools.

BACKGROUND

Integrated circuits ("ICs") are incorporated into many electronic devices. IC packaging has evolved, such that multiple ICs may be vertically stacked in so-called three-dimensional ("3D") packages in order to save horizontal area on a printed circuit board ("PCB"). An alternative packaging technique, referred to as a 2.5D package may use an interposer, which may be formed from a semiconductor material such as silicon, for coupling one or more dies to a PCB. A plurality of IC chips, which may be of heterogeneous technologies, are mounted on the interposer. The packaging industry is also considering combinations of the two techniques, in which a stack of dies are mounted on an interposer, along with other dies or other stacks of dies. Both 2.5D and 3D IC packaging include forming interconnections between the various ports in plural dies.

Integration of plural dies into a package poses many challenges. Individually, each system on a chip (SoC) is tested, and may have many Known Good Functions (IPs). The SoC works as one complete unit. As such, it is verified as a complete unit including the interconnect among Known Good IPs. On the other hand, the 3DIC stack includes Known Good Dies (KGD). Each die is individually verified to be functionally correct.

The verified dies are then integrated into the stacked package configuration. Both 2.5D and 3DIC inter-die connectivity involve the addition of a huge number of microbumps (μbumps) connected between dies.

Debugging stacked dies is very tedious, time consuming and error prone. If an error is made during the debugging process it may become necessary to respin the stacked dies.

DETAILED DESCRIPTION

Figure 1:
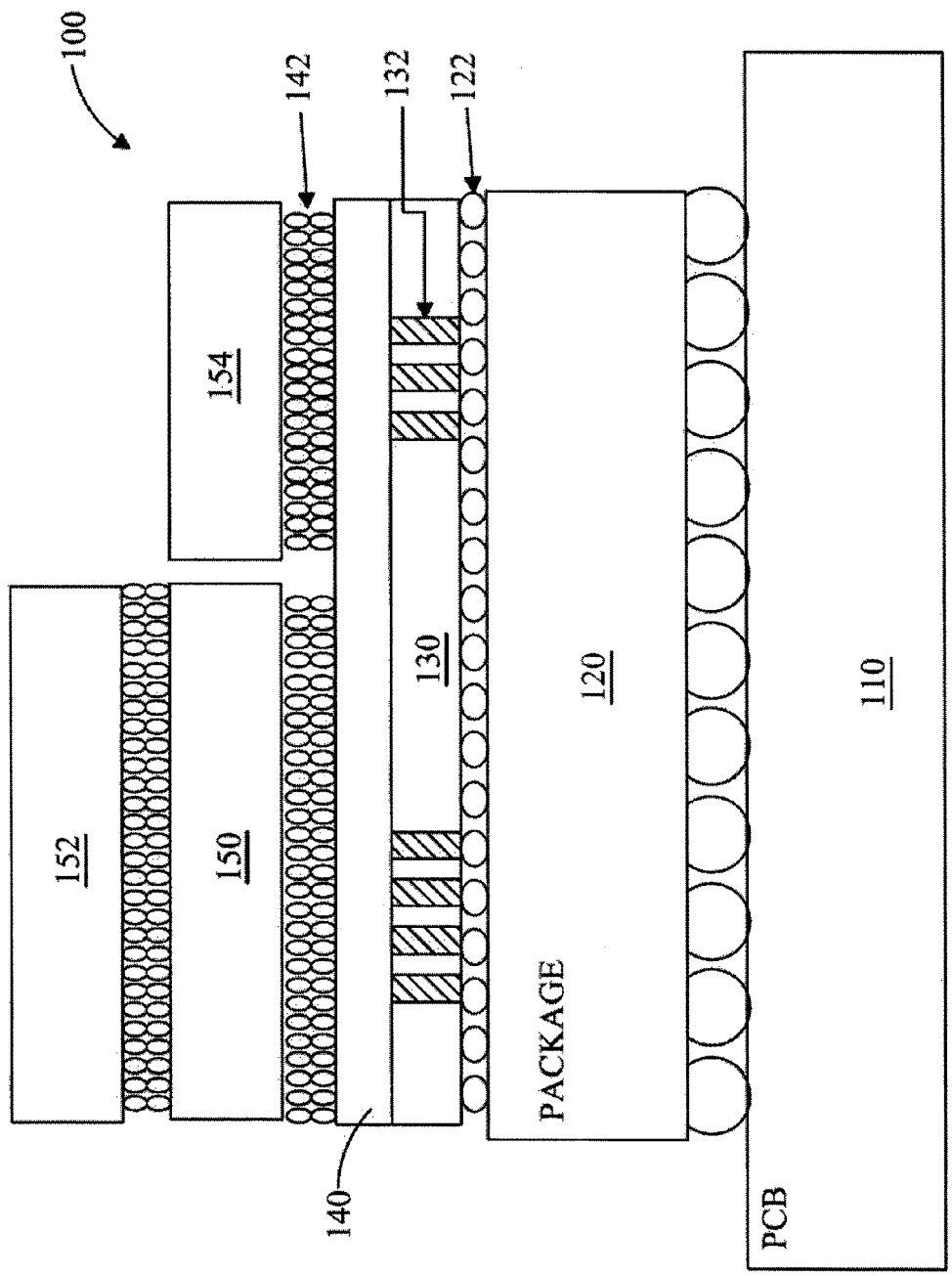
FIG. 1 is a schematic diagram of a stacked die configuration.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1 is a schematic cross-sectional diagram of one example of a stacked die configuration 100. A package substrate 120 is mounted on a printed circuit board 110. The package substrate 120 may be made of CEM-4 woven glass and epoxy material. The PCB 110 may be FR-4, FR-1, CEM-1 or CEM-3, FR-2 (Phenolic cotton paper), FR-3 (Cotton paper and epoxy), FR-4 (Woven glass and epoxy), FR-5 (Woven glass and epoxy), FR-6 (Matte glass and polyester), G-10 (Woven glass and epoxy), CEM-1 (Cotton paper and epoxy), CEM-2 (Cotton paper and epoxy), CEM-3 (Woven glass and epoxy), CEM-4 (Woven glass and epoxy), CEM-5 (Woven glass and polyester).

A fan-out substrate 130 is mounted over the package 120. The fan-out substrate 130 includes a plurality of through substrate vias (TSVs) and a redistribution layer 140, which may include conductive line layers and conductive via layers for redistributing circuit paths between dies 150 and 154 (above) and die 120 below. Dies 150 and 152 are stacked, with interconnections by μbumps 142. Another die 154 is also interconnected to the fan-out substrate 130 by μbumps 142. This is only one example, and the methods described herein may be applied to any configuration including a second die 152 interconnected to a first die 150.

Figure 2:
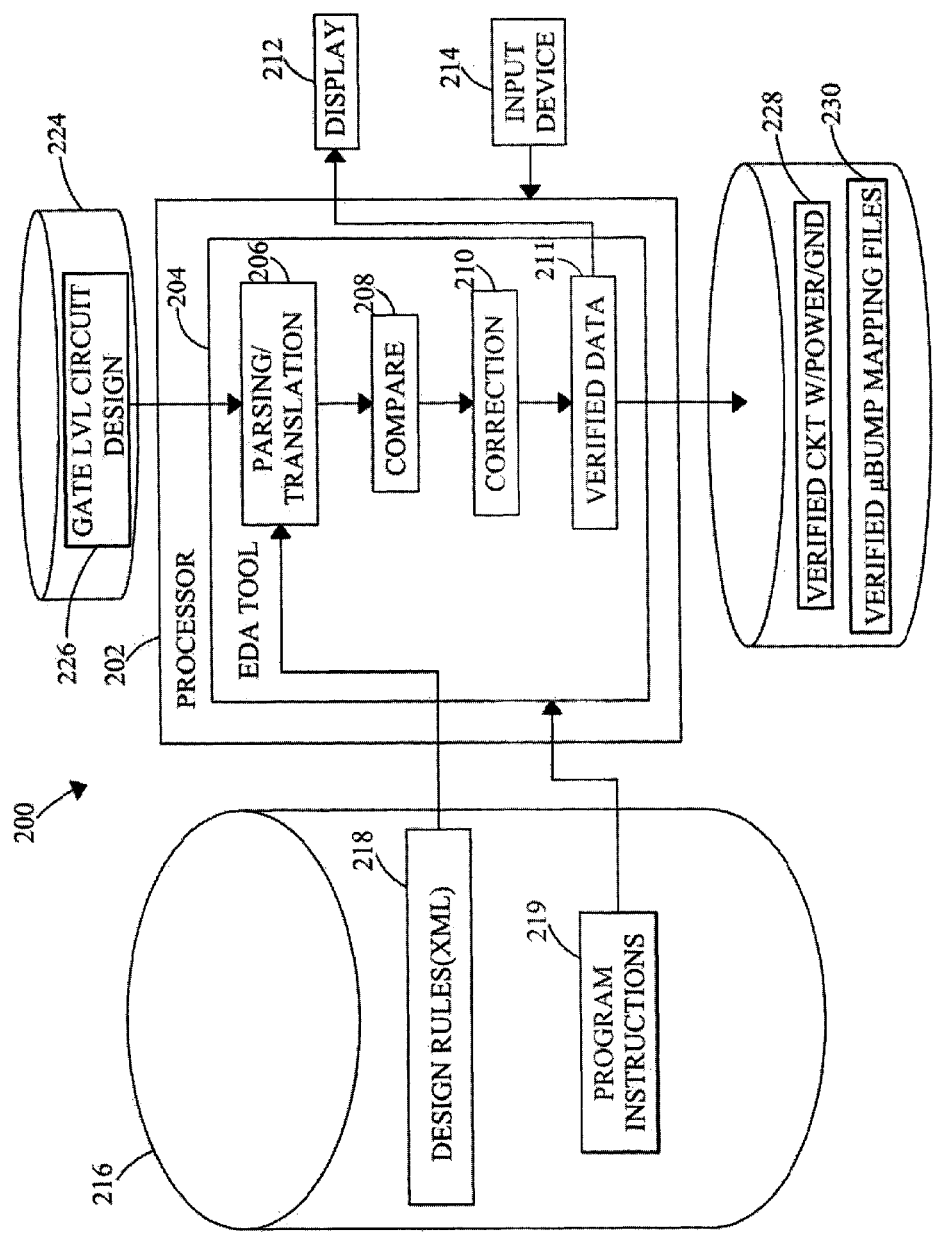
FIG. 2 is a block diagram of an electronic design automation (EDA) tool configured for use in 2.5D and 3D IC design, verification and fabrication.

FIG. 2 is a block diagram of an EDA tool 200 that is used for design and verification of an IC design, and the transformation between a gate-level description of the design and the GDS II layout (transistor level) description (or other suitable layout description format). Although FIG. 2 shows certain functions described below, FIG. 2 is not intended as a complete detailed block diagram of all of the capabilities of EDA tools. For example, the tool may include modules for developing an electronic system level (ESL) synthesis (also referred to as algorithmic synthesis, or behavioral synthesis), using ANSI C/C++/SystemC code, analyzing and architecturally constraining the ESL synthesis design to form a register transfer level (RTL) hardware design language (HDL) description, and then in turn synthesize the RTL description to the gate level description 226 which is processed by the modules 204.

The system includes at least one processor 202 which may be, for example, a general purpose computer or embedded processor configured by programming with special purpose computer program instructions 219 stored in a persistent machine readable storage medium 219. For example, an EDA tool may use a combination of the following modules: logic synthesis, behavioral synthesis, place and route, static timing analysis, formal verification, HDL (SystemC, Systemverilog/Verilog, VHDL) simulators as well as transistor-level circuit simulation. Such systems may include a physical implementation/verification tool, e.g., IC Compiler, or ICValidator Synopsys of Mountain View, Calif., Cadence System Development Suite (e.g.,: SoC Encounter, Cadence Physical Verification System) by Cadence Design Systems, Inc. of San Jose, Calif., and "CALIBRE® INROUTE" by Mentor Graphics of Wilsonville, Oreg.

In addition to the software, the foundry or user provides one or more sets of design rules 218, which are for implementation of particular technology nodes (e.g., 90 nm, 65 nm, 45 nm, or the like).

Input data are stored in a machine readable storage medium 224. In some embodiments, the medium 224 stores a gate level description of a circuit design. For example, the description may be in Verilog format, as created by a designer.

The EDA tool 204 is provided with parsing/translation modules 206, which receive first and second descriptions of the IC dies at one or more different stages of processing by the EDA tool. Each parser generates a respective parsed tree for each respective description of the dies. In some embodiments, a first parser 206 receives a first and a second gate level descriptions of the first and second dies. The second description includes power and ground ports, but the first description does not. In some embodiments, a second parser 206 receives a verified gate level description with power and ground ports and a first µbump mapping data. In some embodiments, a third parser 206 receives first and second µbump mapping data in two different formats for use by different applications. Each parser 206 generate a source parsing tree and a target parsing tree. The leaves of each tree represent the interconnections captured in the corresponding description of the dies. Each parser identifies common data structures or entities appearing in both a first (source) description and second (target) description (representing values before and after a transformation, respectively). The common data structures or entities appearing in both descriptions should contain the same data values in the absence of an error. The parsers format the source and target content information in parsed tree structures which facilitate side by side comparison of data which should be identical in both the source and target data.

The EDA tool 204 is provided with one or more compare modules 208. Each compare module is configured to compare a corresponding source and target parsed tree, and identify any leaves in the target tree which impermissibly differ from the corresponding leaves in the source.

The EDA tool 204 may include one or more optional correction modules 210. The correction modules 210 replace corrupted or incorrectly transformed information in the target circuit description with correct data, based on the content of the source circuit description.

The EDA tool provides one or more sets of verified data 211. In some embodiments, the tool automatically corrects any errors detected by the compare block 210. In other embodiments, the tool displays a notification on a display 212 or other output device, advising the user that a discrepancy has been detected between the source and target descriptions.

At block 228, verified output data sets are stored in a machine readable storage medium The medium may be the same physical device as medium 224, or a separate local device, or a separate storage device accessed via a local, wide area or global communication network (such as the Internet). In some embodiments, the stored outputs include a verified gate level circuit description 228 of a stacked 3D IC design, including power and ground ports. In some embodiments, the stored outputs include at least one verified µbump mapping file 230, identifying interconnections between stacked dies. In some embodiments, plural microbump mapping files 230 are provided, each in a different format, suitable for use by a respective application.

Figure 3:
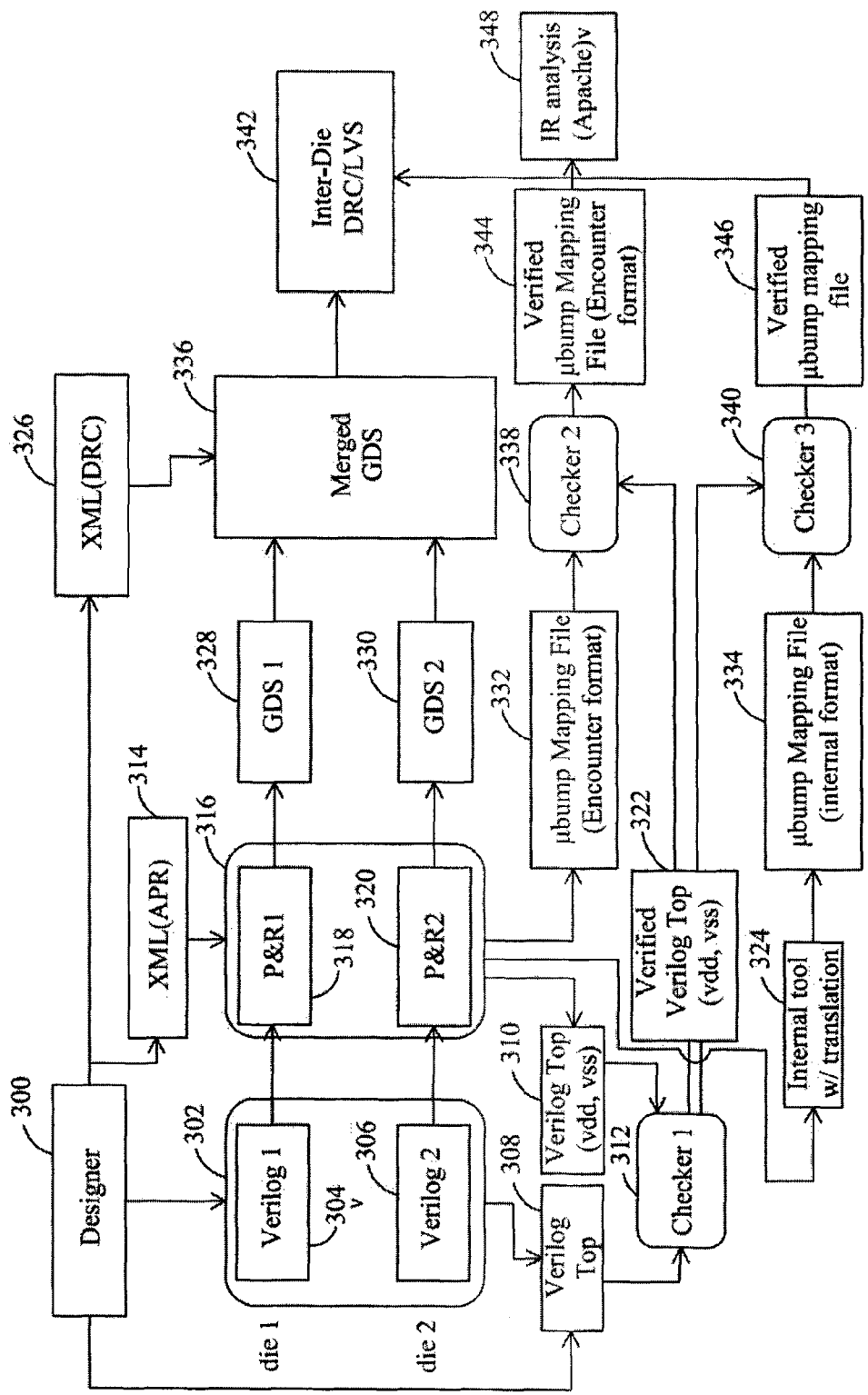
FIG. 3 is a block diagram showing data flow among the elements of the system of FIG. 2.

FIG. 3 is a schematic diagram showing the data flow among the various processes.

At block 300, a designer creates a stacked IC design. In this example, the design description 302 is provided at the gate level. In some embodiments, the designer 300 directly creates the design at the gate level.

In the example, the stacked die description 302 includes the gate level descriptions 302, 304 of two individual dies which are to be stacked one atop the other. The individual gate level descriptions of each die are labeled "Verilog 1" and "Verilog 2", indicating that each is written in a hardware description language (HDL), such as Verilog. Verilog HDL is used to model electronic systems. Verilog is a language with syntax similar to the C programming language, but differs from software programming languages because they include ways of describing the propagation of time and signal dependencies (sensitivity). "Verilog 1" 304 is the top module for a first die, and "Verilog 2" 206 is the top module for a second die. Modules encapsulate design hierarchy, and communicate with other modules through a set of declared input, output, and bidirectional ports. The Verilog 1 module is at the top of the hierarchy of the first die, and the Verilog 2 module is at the top of the hierarchy of second first die.

The two IC descriptions 304, 306 are combined within a wrapper in the Verilog Top module file 308. The Verilog Top module file 308 contains the design information which is independent of the particular technology node, in a Verilog netlist form. Thus, Verilog Top 308 does not have power (Vdd) and ground (Vss) port information.

An additional set of technology node dependent inputs is included in the design rules, which may be provided in an extensible markup language (XML) file 314. The design rules 314 are provided along with the gate level descriptions Verilog-1 302 and Verilog-2 306 to an automated place and route (APR) tool 316.

The APR tool 316 separately performs place and route operations for each die 150, 152, placing each IP library cell, and routing the interconnect lines and vias within each individual die, including the connections to Vdd and Vss. The resulting layout of each die 150, 152 is stored in the respective GDS II files 328, 330, for dies 150 and 152 respectively.

The GDS II files 328, 330, for dies 150 and 152 are merged to provide merged GDS data 336 for the stacked die. An additional design rule checks (DRC) file 326 is provided, for example, in an XML file 326. The merged GDS 336 and DRC data 326 are input to the Inter-Die DRC and layout-versus-schematic (LVS) processing. The DRC/LVS processing is intended to ensure that the layouts of the stacked dies all conform to the original schematic design and the design rules for the technology node of the ICs.

Additionally, APR tool 316 generates a µbump mapping file 332 (which may be in a tool specific format, such as the "ENCOUNTER" format used by the Cadence software). The µbump mapping file 332 is used for interconnecting the µbumps of the first die 150 to the µbumps of the second die 154 when the dies are stacked. The µbump mapping file 332 is generated for the purpose of use in dynamic power rail (IR) analysis of the stacked die configuration.

The APR tool 316 also uses the information from both Verilog-1 304 and Verilog-2 306, to add the Vdd and Vss connections to the individual Verilog-1 and Verilog-2 files.

The result is output as the Verilog Top (Vdd, Vss) file 310. During this process, there is a possibility of corruption of the original Verilog data created by the designer 300. Absent, such an error, the input and output ports (for either die) in the Verilog Top (Vdd, Vss) file 310 should match, the input and output ports (for that same die) in the Verilog Top file 308.

In the embodiment of FIG. 3, a checker 312 is provided, to parse the Verilog Top file 308 and Verilog Top (Vdd, Vss) file 310, compare the corresponding data structures or entities in each of these files, and report any discrepancies. In some embodiments, the checker 312 optionally performs automated correction of any found error. If automated correction is not used, then a user can manually perform edits to correct the errors. In either case, following the corrects, the result is a Verified Verilog (Vdd, Vss) file 322. This file contains the complete and correct netlist information for the dies compliant with the designer's original Verilog design, augmented with the Vdd and Vss information.

In some embodiments, a second checker 338 is provided. Checker 338 receives the Verified Verilog (Vdd, Vss) file 322 and the μbump mapping file 332. Checker 338 parses the Verified Verilog (Vdd, Vss) file 322 and the μbump mapping file 332, compares the corresponding data structures or entities in each of these files, and report any discrepancies. In some embodiments, the checker 322 optionally performs automated correction of any found error. If automated correction is not used, then a user can manually perform edits to correct the errors. In either case, following the corrects, the result is a Verified μbump mapping file 344 in the format of the file 332. This file contains the complete and correct μbump mapping file information. The file is provided to the dynamic power rail (IR) analysis software 348, such as "CADENCE ENCOUNTER" software.

In some embodiments, the μbump mapping information is used by a another application, which may be configured to receive the data in a different format from file 332. This may be a standard format, a commercial software program format, or an internally developed format used by the designer or foundry. Either the designer or the foundry may perform a translation 324 on the Verified Verilog Top (Vss, Vdd) data 310 to generate μbump mapping file 334 in this different format. The data may be presented with a different sequence, precision or in some cases, fewer or more data fields than the file 332. The at least one storage medium 224 (FIG. 2) includes a fifth portion for storing a translated μbump mapping data 334 received from a translation tool 324, the translated μbump mapping data having a different format from the first μbump mapping data 332 and from the verified second gate level description 322.

Thus, an optional third checker 340 may be provided. Third checker 340 receives the Verified Verilog (Vdd, Vss) data 322 and the internally formatted μbump mapping file 334. Third checker 340 parses the Verified Verilog (Vdd, Vss) file 322 and the μbump mapping file 332, compares the corresponding data structures or entities in each of these files, and reports any discrepancies. In some embodiments, the checker 322 optionally performs automated correction of any found error. If automated correction is not used, then a user can manually perform edits to correct the errors. In either case, following the corrections, the result is a Verified, internally-formatted μbump mapping file 346 in the format of the file 334. In some embodiments, the internally-formatted file 346 is used for the inter-die DRC/LVS.

Figure 4:
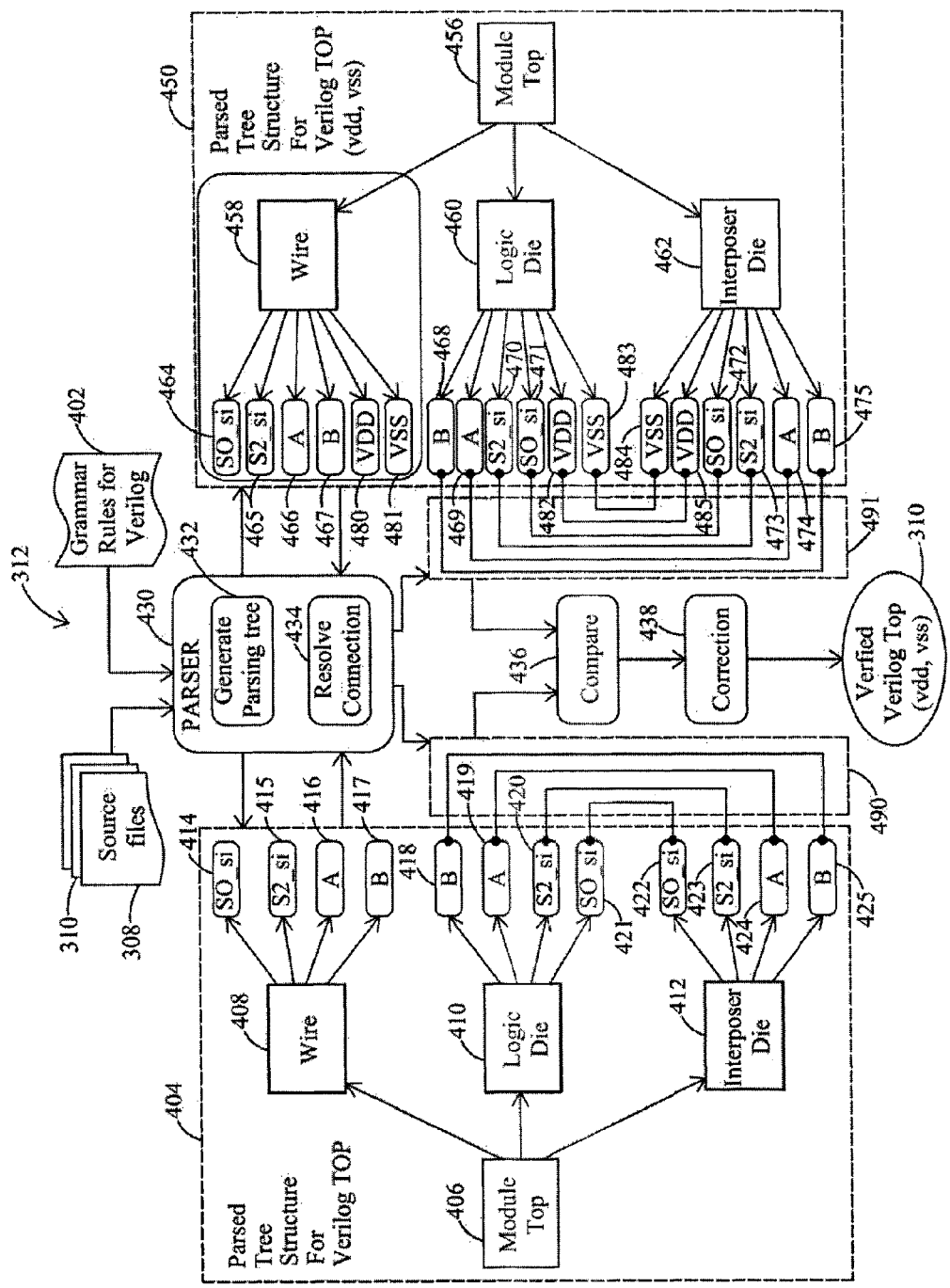
FIG. 4 is a detailed schematic diagram showing the verification and correction of the gate level description of a stacked die configuration, as shown in FIG. 2.

FIG. 4 is a schematic view showing the operation of the first verification module (first checker) 312. Module 312 is a processor-module for comparing the first and second gate level descriptions 308, 310 and outputting an error report if the second gate level description 310 has an error. The first verification module 312 outputs the verified second gate-level description 322 of the first and second circuit patterns of dies 150 and 152.

The first verification module 312 receives the source HDL files 308, 310 and a set of grammar rules 402 defining the formats and data fields in the source files. The input files 308, 310, 402 are provided to a first parser module 432 within the first verification module 312. The first parser module 432 receives the first and second gate level descriptions 304, 306 of the first and second IC dies 150, 152. The block 432 generates a source parsing tree 404 having respective leaves 418-425 representing each port of the first and second IC dies 150, 152 according to the first gate level description 308, and a target parsing tree 450 having respective leaves 468-475, 480-485 representing each port of the first and second IC dies 150, 152 according to the second gate level description, wherein the first verification module 312 compares each leaf 468-475, 482-485 of the target parsing tree 450 to a corresponding leaf 418-425 of the source parsing tree 404.

Figure 5:
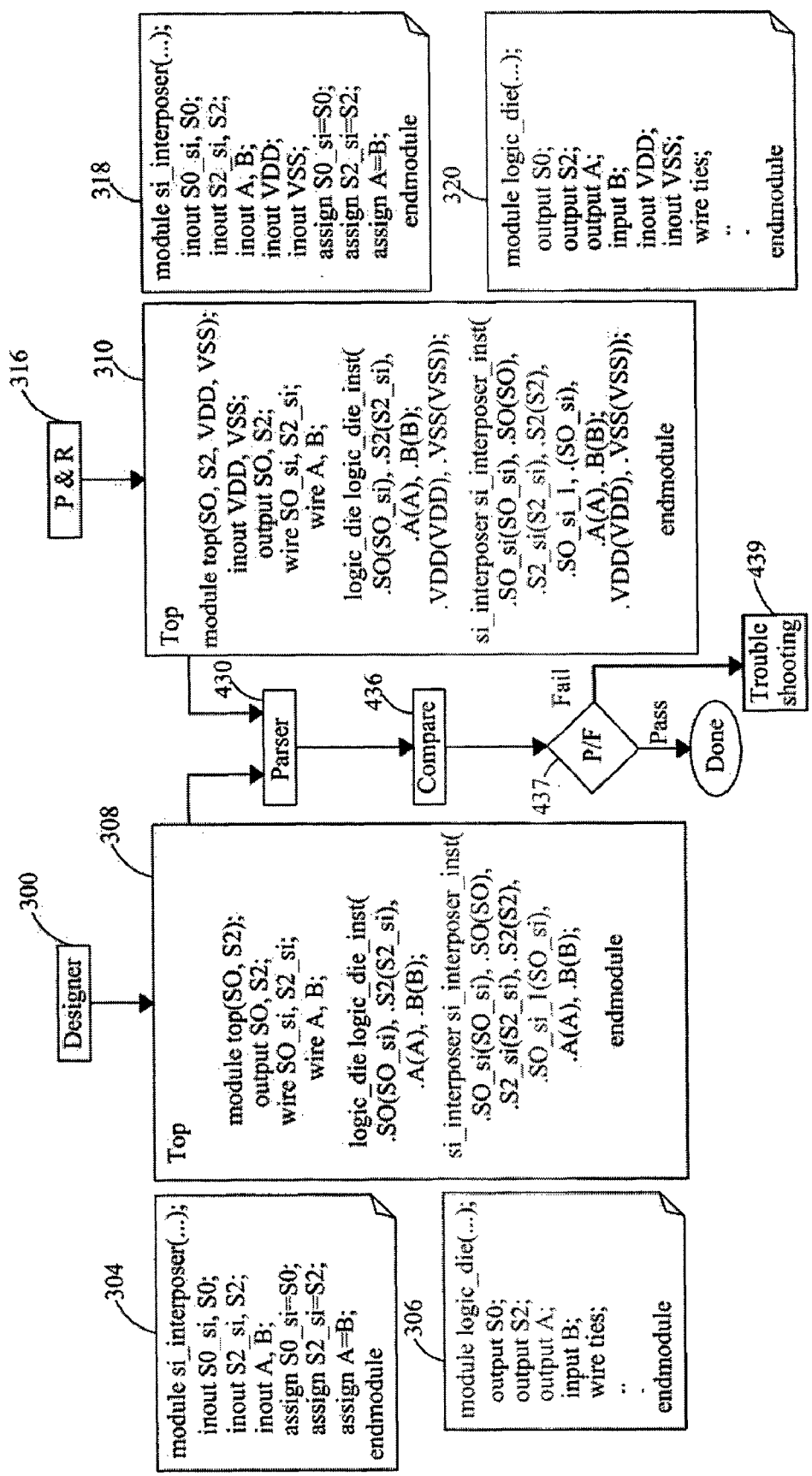
FIG. 5 shows an example of the gate level description verification of FIG. 4.

FIG. 5 schematically shows a simplified example of these data having only four ports (besides Vss, Vdd), for which the trees 404 and 450 are generated. In FIG. 5, the blocks 304 and 306 represent the Verilog-1 and Verilog-2 representations of dies 150 and 152, respectively, as generated by the designer. Four ports are identified: SO_si, S2_si, A and B. These data are merged into the Verilog top file 308. The APR tool 316 adds the Vdd, Vss information to form the Verilog files 318, 320, which are merged into the Verilog Top (Vdd, Vss) file 310. The first parser module 430 generates and stores the following parameters in leaves of the source parsing tree 404: for each port SO_si, S2_si, A and B, of the first die 150 or second die 152 identified as a source port of a connection in the source connection list 490, a corresponding source list destination die and source list destination port are included as leaves 418-421 of the tree 404. For each port of the first die or second die identified as a destination port of a connection in the source connection list 490, a corresponding source list source die and source list source port are included as leaves 422-425 of the tree 404. The wires 414-417 are also included in the Verilog Top 308 and Verilog Top (Vdd, Vss) 310 files. Also shown in FIG. 5 is a simplified example in which, upon detecting a discrepancy at block 437 between a pair of corresponding data in the files 308, 310, the checker 312 issues a notification and trouble shooting 439 is performed manually.

It will be understood that there may be any number of dies, and that each die may have any number of ports. The simplified configuration discussed and shown herein is only provided as an example, and does not limit the variety of practical implementations. In a stacked die package, each die may have thousands of μbumps, which would make manual checking and debugging of the μbump mapping data difficult, tedious, expensive and error prone.

Referring again to FIG. 4, the parser 432 enters a state machine to parse the input files, and generate the parsing tree, until the whole tree is generated. Each leaf node 418-421 has a source die name and source port name, and each leaf node 422-425 has a destination die name and destination port name. Each left child node points to a node at next tree level. Each right child node will point to next node at same tree level.

Next, the parser 430 enters the resolve connection block 434. Block 434 determines how ports are connected in Verilog TOP. Module 434 checks to see which output of an instance (e.g. output of Logic Die 410) is connected to which input of another instance (e.g. Interposer Die 412). Once this is established, block 434 checks this connection against the corresponding connection of the Verilog TOP (vss,vdd) file 450.

For example, in Verilog TOP tree 404, if output A (leaf node) of Logic Die 410 is connected to input A of Interposer Die 412, then the same connection should exist in Verilog TOP (vss,vdd) tree 450. In addition, in the Verilog TOP (vss, vdd) file 310, module 434 checks to see that VDD 482 is connected to VDD 485 and VSS 483 is connected to VSS 484.

Resolve connection block 434 establishes the connection relationship between leaf nodes (i.e. the ports of verilog module) of the parsing trees 404, 450. The inputs of the resolve connection block 434 include: (1) The parsing trees 404, 450, which has the source side and source node name information; and (2) The connection relationship obtained from the parsing stage. The parsing stage uses grammar rules defined specific for the input source files 402, to generate the connection relationship list. Then it will traverse the parsing tree to build the connection between yellow nodes by filling out the node connection descriptor of each node.

Block 434 fills each leaf node 418-421 with two pieces of information: destination die name and destination port name. This step will continue until all node destination ports are identified, thus, resolving the connection relationships. The "resolve connections" block 434 in the first parser module 430 generates a source connection list 490 based on the first gate level description. The source connection list includes, for each connection between the first IC die and the second IC die, a source die, a destination die, a source port, and a destination port. Each of the connecting lines within block 490 represents these four data items in the list 490. During this process the wires 414-417 are used only to determine to which ports each wire 414-417 is connected. Once that is done, the wire information 414-417 is not used in the subsequent comparisons between source and target files. Only the port connections 418-425, and 468-475, 482-485 are compared between the two Verilog files 308, 310.

Similarly the first parser module 432 generates and stores the following parameters in leaves of the target parsing tree: for each port of the first die or second die identified as a source port of a connection in the target connection list 491, a corresponding target list destination die and target list destination port are included as leaves 468-471 of the tree 450. For each port of the first die or second die identified as a destination port of a connection in the target connection list, a corresponding target list source die and target list source port are included as leaves 472-475 of the tree 450. As in the case of the wire information of the source file, the wire information 464-467, 480-481 of the target file is only used in resolving the connections, but is not part of the subsequent compare operations.

Block 434 also generates a target connection list 491 based on the second gate level description, the target connection list including, for each connection between the first IC die and the second IC die, a source die, a destination die, a source port, and a destination port. Each of the connecting lines within block 491 represents these four data items in the list 491.

As shown in FIG. 4, the first verification module 312 further comprises a compare module 436. As apparent from FIG. 5, the Verilog Top file 308 and the Verilog Top (Vdd, Vss) file 310 follow the same statement format (i.e., Verilog format). The only expected difference between the two files 308, 310 should be the addition of Vdd and Vss in file 310. The Verilog Top tree 404 lacks Vdd and Vss ports, so comparison with the Vdd, Vss ports of the tree 450 is skipped. In the example, only the leaf nodes in the parsing tree are compared to corresponding leaves in the other parsing tree. Comparison between the other nodes in each parsing tree are skipped.

In the example, compare module 436 generates and outputs the error report if, for a given leaf 418-425 of the source parsing tree 404 any of the following conditions is detected:
(a) the target list source die of the corresponding leaf of the target parsing tree is different from the source list source die of the given leaf,
(b) the target list source port of the corresponding leaf of the target parsing tree is different from the source list source port of the given leaf,
(c) the target list destination die of the corresponding leaf of the target parsing tree is different from the source list destination die of the given leaf, or
(d) the target list destination port of the corresponding leaf of the target parsing tree is different from the source list destination port of the given leaf.

Thus, for the connection lists 490, 491, each connection in the target list should have the same values as the corresponding connection in the source list for (a) source die, (b) source port, (c) destination die, and (d) destination port. In making the comparison, the compare module 436 recognizes that certain entities have permissible differences. In other words, compare module 436 recognizes that the Verilog Top parsed tree 404 is not supposed to have Vdd and Vss leaves. So the module 436 ignores the fact that tree 404 has no leaves corresponding to the leaves 482-485 of the target file. Other than these predetermined exceptions, which are defined in the rules file 402, all other differences between the source and target trees are flagged as errors.

As shown in block 438 of FIG. 4, in some embodiments, first verification module 312 further includes a correction module that corrects an error in at least one of the group consisting of the target list source die, target list source port, target list destination port, and the target list destination die if the compare module generates an error report. Thus, automated correction of the Verilog data 308 is achieved.

Figure 6:
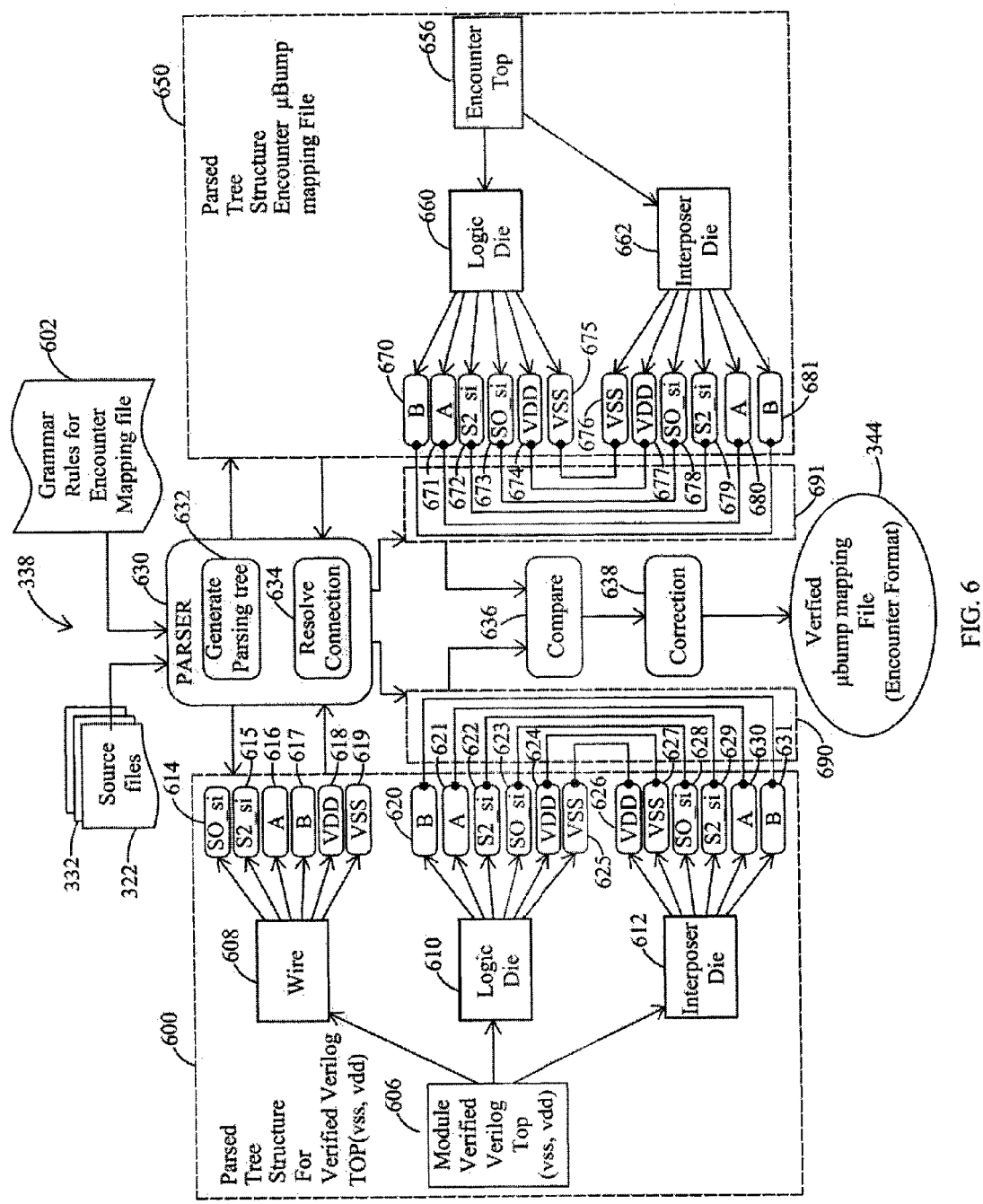
FIG. 6 is a detailed schematic diagram showing the verification and correction of the μbump mapping file of the stacked die configuration, as shown in FIG. 2.

FIG. 6 is a schematic view showing the operation of the second verification module (second checker) 338. FIG. 6 shows the continuing flow of the process for the same input data as the example of FIGS. 4 and 5. Module 338 is a processor-implemented module for comparing the first μbump mapping data 332 to the verified second gate level description 322 and outputting an error report if the first μbump mapping data has an error. The second verification module 338 outputs verified μbump mapping data.

The second verification module 338 receives the source files 322, 332 and a set of grammar rules 602 defining the formats and data fields in the source files. The input files 322, 332, 602 are provided to a second parser module 632 within the second verification module 338. The second parser module 632 receives the verified second gate level description 322 and the first μbump mapping data 332. The block 632 generates a source parsing tree 604 having respective leaves 620-631 representing each port of the first and second IC dies 150, 152 according to the verified second gate level description 322, and a target parsing tree 450 having respective leaves 670-681 representing each port of the first and second IC dies 150, 152 according to the μbump mapping data 332, wherein the second verification module 338 compares each leaf 670-681 of the target parsing tree 650 to a corresponding leaf 620-631 of the source parsing tree 600.

Figure 7:
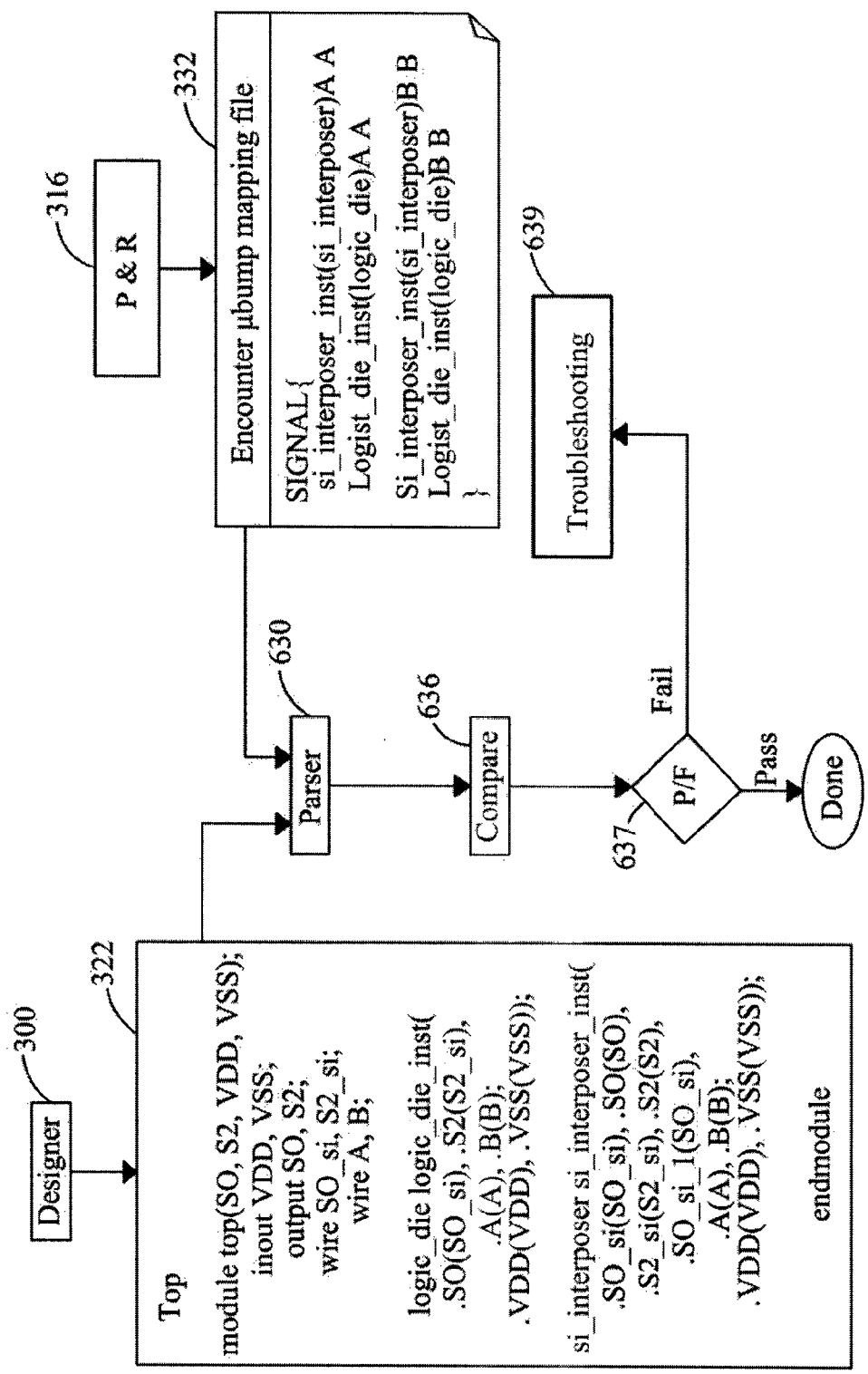
FIG. 7 shows an example of the μbump mapping file verification of FIG. 6.

FIG. 7 schematically shows a simplified example of this stage of processing, continuing with the input example of FIGS. 4-6. In FIG. 7, block 322 represents the verified Verilog Top (Vdd, Vss) file 322 output from the first verification module 312. Four ports are identified: SO_si, S2_si, A and B.

The second parser module 632 generates and stores the following parameters in leaves of the source parsing tree 404: for each port SO_si, S2_si, A, B, Vdd and Vss of the first die 150 or second die 152 identified as a source port of a connection in the source connection list 690, a corresponding source list destination die and source list destination port are included as leaves 620-625 of the tree 600. For each port of the first die or second die identified as a destination port of a connection in the source connection list 690, a corresponding source list source die and source list source port are included as leaves 626-631 of the tree 600. The wires 614-619 are also included in the Verified Verilog Top (Vdd, Vss) 322 files, but are ignored by the second parser. Also shown in FIG. 7 is a simplified example in which, upon detecting a discrepancy at block 637 between a pair of corresponding data in the files 322 and 332, the checker 338 issues a notification and trouble shooting 639 is performed manually.

Referring again to FIG. 6, the parsing tree generator 632 (1) reads the source files to determine the target μbump mapping file format; (2) Based on the format of μbump mapping file 332, 334, the parser 432 will select corresponding grammar rule to parse the target file; (3) The source file will be in verilog format, so the verilog grammar rule will be used for it.

Then the parser 632 enters a state machine to parse the input files, and generate the parsing tree, until the whole tree is generated.

Referring again to FIG. 7, a "resolve connections" block 634 in the second parser module 630 generates a source connection list 690 based on the verified gate level description. The source connection list includes, for each connection between the first IC die and the second IC die, a source die, a destination die, a source port, and a destination port. Each of the connecting lines shown within block 690 represents these four data items in the connections list. During this process the wires 614-619 are not used. Only the port connections 620-625, and 670-675 are compared between the two files 322, 332.

Block 634 also generates a target connection list 691 based on the Verified Verilog Top (Vdd, Vss) file 322. The target connection list includes, for each connection between the first IC die and the second IC die, a source die, a destination die, a source port, and a destination port. Each of the connecting lines within block 691 represents these four data items in the list 691.

The second parser module 632 generates and stores the following parameters in leaves of the target parsing tree: for each port of the first die or second die identified as a source port of a connection in the target connection list 691, a corresponding target list destination die and target list destination port are included as leaves 676-681 of the tree 650. For each port of the first die or second die identified as a destination port of a connection in the target connection list, a corresponding target list source die and target list source port are included as leaves 676-681 of the tree 650.

As shown in FIG. 6, the second verification module 338 further comprises a compare module 636. As apparent from FIG. 7, the μbump mapping data file 332 has a different format from the Verilog format of file 322. Thus, the Grammar rules 602 (FIG. 6) identify the fields and formats of the data in file 332 which correspond to the relevant data in file 322.

In the example, compare module 636 generates and outputs the error report if, for a given leaf 620-631 of the source parsing tree 600 any of the following conditions is detected:

(a) the target list source die of the corresponding leaf of the target parsing tree is different from the source list source die of the given leaf, (b) the target list source port of the corresponding leaf of the target parsing tree is different from the source list source port of the given leaf, (c) the target list destination die of the corresponding leaf of the target parsing tree is different from the source list destination die of the given leaf, or (d) the target list destination port of the corresponding leaf of the target parsing tree is different from the source list destination port of the given leaf.

Thus, for the connection lists 690, 691, each connection in the target list should have the same values as the corresponding connection in the source list for (a) source die, (b) source port, (c) destination die, and (d) destination port.

As shown in block 638 of FIG. 6, in some embodiments, second verification module 338 further includes a correction module that corrects an error in at least one of the group consisting of the target list source die, target list source port, target list destination port, and the target list destination die if the compare module generates an error report. Thus, automated correction of the first μbump mapping data is achieved.

Figure 8:
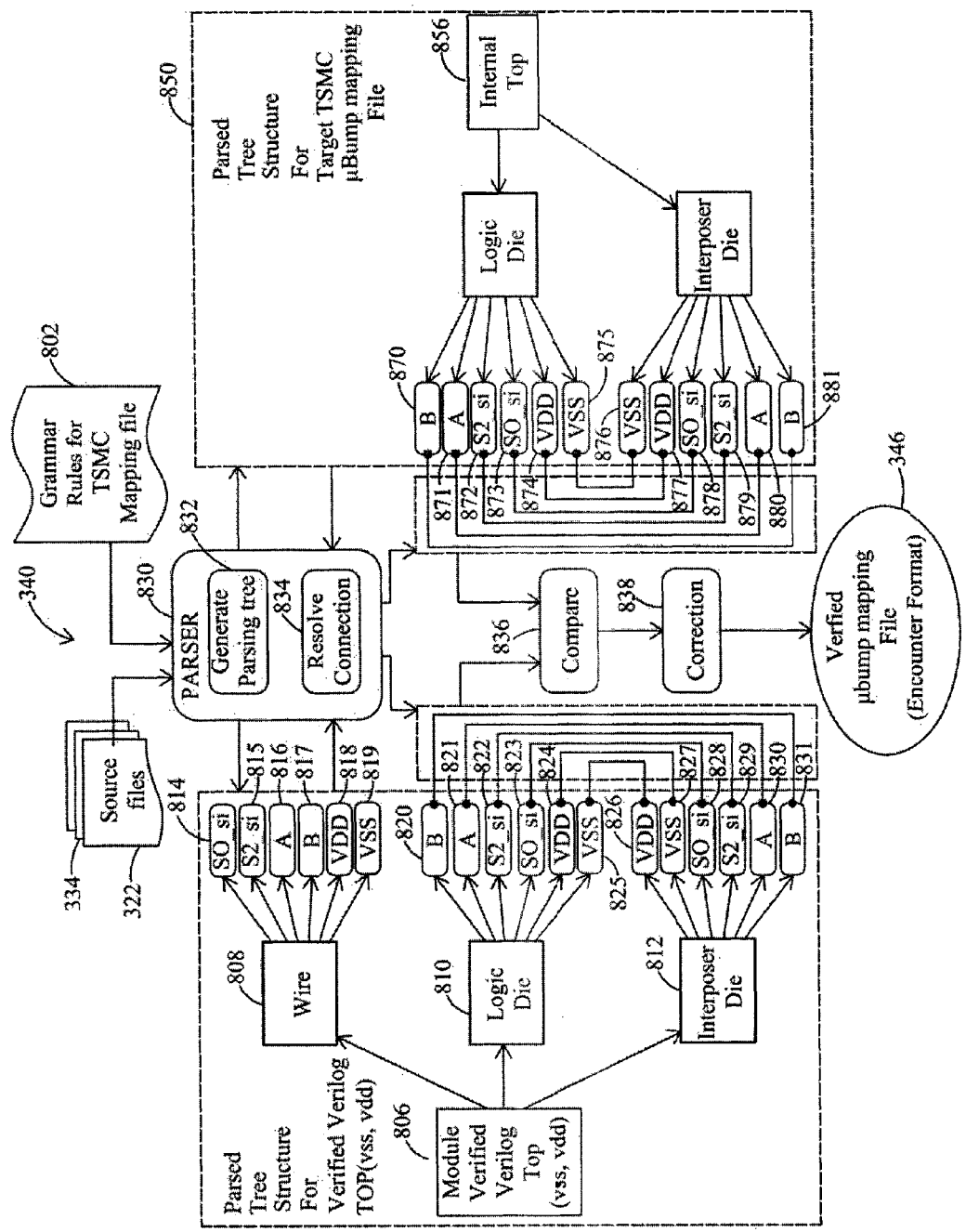
FIG. 8 is a detailed schematic diagram showing the verification and correction of the alternatively formatted μbump mapping file of the stacked die configuration, as shown in FIG. 2.

FIG. 8 is a schematic view showing the operation of the third verification module (third checker) 340. FIG. 8 shows the continuing flow of the process for the same input data as the example of FIGS. 4-7. Module 340 is a processor-implemented module for comparing the second (translated) μbump mapping data 334 to the verified second gate level description 322 and outputting an error report if the first μbump mapping data has an error. The third verification module 340 outputs verified μbump mapping data in a second format, such as a non-standard format used with a foundry. Such a format may be used to interface with a legacy software program or an special purpose engineering analysis tool, for example.

The third verification module 340 receives the source files 322, 334 and a set of grammar rules 802 defining the formats and data fields in the source files. The input files 322, 334, 802 are provided to a third parser module 832 within the third verification module 340. The third parser module 832 receives the verified second gate level description 322 and the second (translated) μbump mapping data 334. The block 832 generates a source parsing tree 800 having respective leaves 820-831 representing each port of the first and second IC dies 150, 152 according to the verified second gate level description 322, and a target parsing tree 850 having respective leaves 870-881 representing each port of the first and second IC dies 150, 152 according to the translated μbump mapping data 334, wherein the third verification module 340 compares each leaf 870-881 of the target parsing tree 850 to a corresponding leaf 820-831 of the source parsing tree 800.

Figure 9:
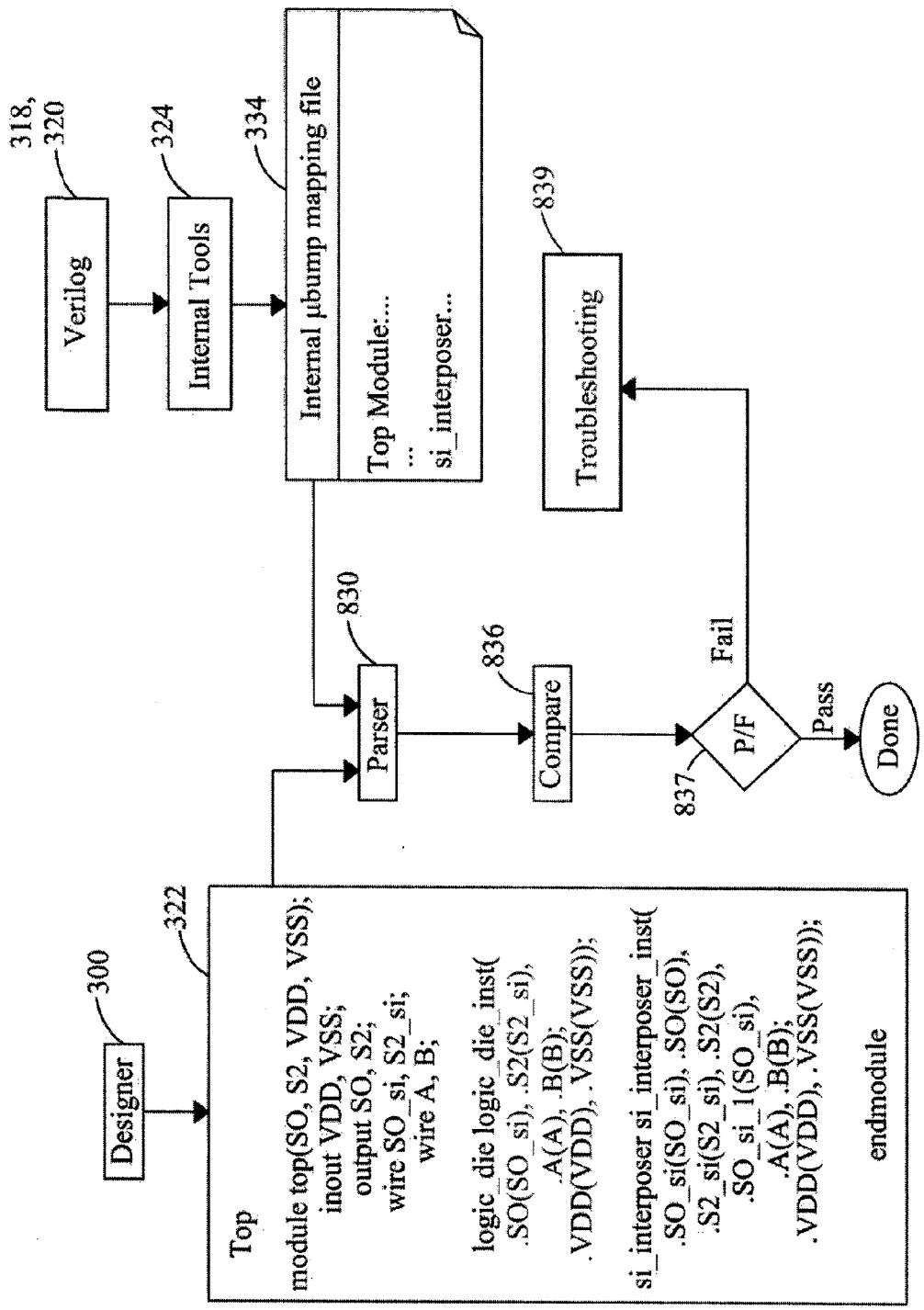
FIG. 9 shows an example of the alternatively formatted μbump mapping file verification of FIG. 8.

FIG. 9 schematically shows a simplified example of this stage of processing, continuing with the input example of FIGS. 4-8. In FIG. 9, block 322 represents the verified Verilog Top (Vdd, Vss) file 322 output from the first verification module 312. Four ports are identified: SO_si, S2_si, A and B. The third parser module 832 generates and stores the following parameters in leaves of the source parsing tree 800: for each port SO_si, S2_si, A, B, Vdd and Vss of the first die 150 or second die 152 identified as a source port of a connection in the source connection list 890, a corresponding source list destination die and source list destination port are included as leaves 820-825 of the tree 800. For each port of the first die or second die identified as a destination port of a connection in the source connection list 890, a corresponding source list source die and source list source port are included as leaves 826-831 of the tree 800. The wires 814-819 are also included in the Verified Verilog Top (Vdd, Vss) 322 files, but are not used by the third parser. Also shown in FIG. 9 is a simplified example in which, upon detecting a discrepancy at block 837 between a pair of corresponding data in the files 322 and 334, the checker 340 issues a notification and trouble shooting 839 is performed manually.

Referring again to FIG. 9, a "resolve connections" block 834 in the third parser module 830 generates a source connection list 890 based on the verified gate level description. The source connection list includes, for each connection between the first IC die and the second IC die, a source die, a destination die, a source port, and a destination port. Each of the connecting lines shown within block 890 represents these four data items in the connections list. During this process the wires 814-819 are not used. Only the port connections 820-825, and 870-875 are compared between the two files 322, 334.

Block 834 also generates a target connection list 891 based on the Verified Verilog Top (Vdd, Vss) file 322. The target connection list includes, for each connection between the first IC die and the second IC die, a source die, a destination die, a source port, and a destination port. Each of the connecting lines within block 891 represents these four data items in the list 891.

The second parser module 832 generates and stores the following parameters in leaves of the target parsing tree: for each port of the first die or second die identified as a source port of a connection in the target connection list 891, a corresponding target list destination die and target list destination port are included as leaves 876-881 of the tree 850. For each port of the first die or second die identified as a destination port of a connection in the target connection list, a corresponding target list source die and target list source port are included as leaves 876-881 of the tree 850.

As shown in FIG. 8, the third verification module 340 further comprises a compare module 836. The translated μbump mapping data file 334 has a different format from the Verilog format of file 322 and the μbump mapping data file 332. Thus, the Grammar rules 802 (FIG. 8) identify the fields and formats of the data in file 334 which correspond to the relevant data in file 322. The checker 340 "checks" to see if, for example, the internal format μbump mapping file 334 is "logically the same" as verified Verilog Top Vdd, Vss 322. But the format of the verified internal format μbump mapping file 346 is identical to the format of file 334.

In the example, compare module 836 generates and outputs the error report if, for a given leaf 820-831 of the source parsing tree 800 any of the following conditions is detected:

(a) the target list source die of the corresponding leaf of the target parsing tree is different from the source list source die of the given leaf, (b) the target list source port of the corresponding leaf of the target parsing tree is different from the source list source port of the given leaf, (c) the target list destination die of the corresponding leaf of the target parsing tree is different from the source list destination die of the given leaf, or (d) the target list destination port of the corresponding leaf of the target parsing tree is different from the source list destination port of the given leaf.

Thus, for the connection lists 890, 891, each connection in the target list should have the same values as the corresponding connection in the source list for (a) source die, (b) source port, (c) destination die, and (d) destination port.

As shown in block 838 of FIG. 8, in some embodiments, third verification module 340 further includes a correction module that corrects an error in at least one of the group consisting of the target list source die, target list source port, target list destination port, and the target list destination die if the compare module 836 generates an error report. Thus, automated correction of the translated (second) μbump mapping data is achieved.

Figure 10:
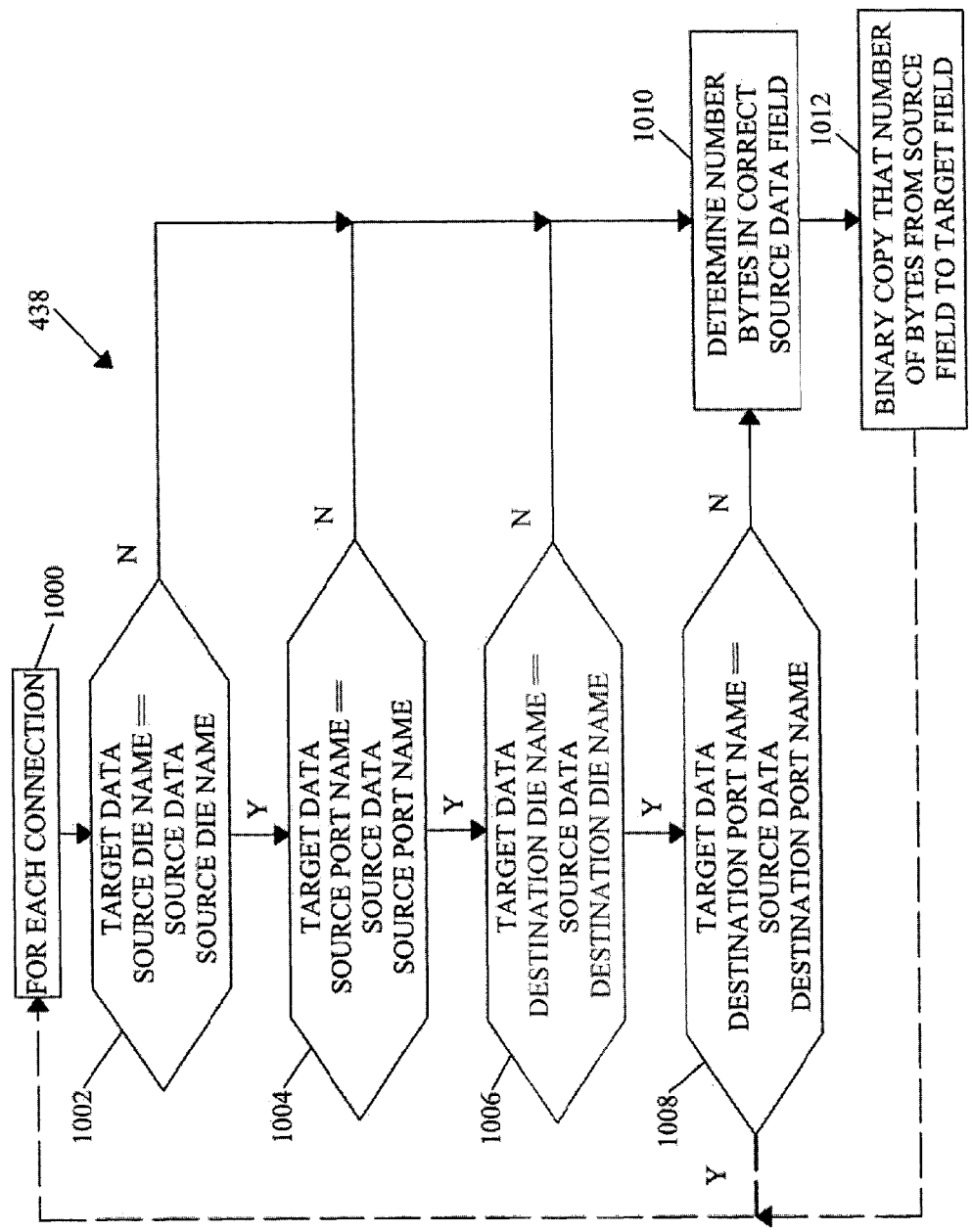
FIG. 10 is a flow chart of an example of a correction module as shown in FIGS. 4, 6 and 8.

FIG. 10 is a flow chart of an example of the correction module 438 of FIG. 4.

At step 1000, a loop is executed for every connection 490, 491 (shown in FIG. 4).

At step 1002, a determination is made whether the target data source die name in the target file (e.g., Verilog Top Vdd, Vss) for the connection equals the source data source die name for the corresponding connection in the source file (e.g., Verilog Top). In performing this comparison, the rules file 402 (FIG. 4) identifies that the Vdd and Vss connections of the target file are not to be compared to the source file, which correctly lacks Vdd and Vss ports. If the die names are the same, step 1004 is performed next. If the die names are different, step 1010 is performed next.

At step 1004, a determination is made whether the target data source port name in the target file (e.g., Verilog Top Vdd, Vss) for the connection equals the source data source port name for the corresponding connection in the source file (e.g., Verilog Top). If the port names are the same, step 1006 is performed next. If the port names are different, step 1010 is performed next. As in step 1002, the Vdd and Vss connections of the target file are not compared to the source file.

At step 1006, a determination is made whether the target data destination die name in the target file (e.g., Verilog Top Vdd, Vss) for the connection equals the source data destination die name for the corresponding connection in the source file (e.g., Verilog Top). If the die names are the same, step 1008 is performed next. If the die names are different, step 1010 is performed next. As in step 1002, the Vdd and Vss connections of the target file are not compared to the source file.

At step 1008, a determination is made whether the target data destination port name in the target file (e.g., Verilog Top Vdd, Vss) for the connection equals the source data destination port name for the corresponding connection in the source file (e.g., Verilog Top). If the port names are the same, control returns to step 1000. If the port names are different, step 1010 is performed next. As in step 1002, the Vdd and Vss connections of the target file are not compared to the source file.

At step 1010, the number of bytes in the correct data field of the source file is determined from the rules file 402 (FIG. 4).

At step 1012, a binary copy operation is performed to copy the determined number of bytes from the source field to the corresponding target field. Thus, the designer's source file is presumed to be correct, and discrepancies between the source and target are resolved by a binary copy of the pertinent source data into the corresponding target field.

Although an example of the correction block 438 is provided, the correction modules 638 (FIG. 6) and 838 (FIG. 8) can be provided in a similar fashion. In the case of modules 638 and 838, the source and target files are known to have different formats. In some embodiments, differences in format between the source (Verified Verilog Top Vdd, Vss) and target μbump mapping file are reconciled by the parsers 630, 830, so that the parsed tree structures 600, 650, 800, 850 are created in the same format. Then any differences in the formats of the source and target files are hidden from the comparison in steps 1002, 1004, 1006, and 1008.

In other embodiments, the parsed tree structures 600, 650, 800, 850 may reflect the formats of the files that are parsed. In such embodiments, differences in format may be handled by performing a translation before each comparison, so that identically formatted data are compared, or by comparison logic which ignores normal expected differences.

The embodiments described above provide verified μbump mapping information for DRC/LVS and packaging. This information can be used to ensure that the inter die mapping is correct before die stacking, and before DRC/LVS flow.

In some embodiments, the same user generates and runs the verification program on the μbump mapping information. In other embodiments, the first, second, and/or third verification module may be run by a user that does not generate the Verified Verilog Top (Vdd, Vss) file, or by a user who does not generate the μbump mapping information. Thus, errors in 3rd Party μbump mapping files. The user can ensure that 3DIC packaging is correct. A long and tedious diagnostic process is avoided. High costs of fixing stacked die packages is also avoided.

Using the tools described above, the system can make sure all 'derived' mapping files are consistent with the input Verified Verilog file. The system can detect/correct errors in the Verilog TOP (Vdd, Vss) file, which has the manually added VSS/VDD ports. The system can detect/correct errors in the internal tool generated μbump mapping file. The system can detect/correct errors in μbump mapping files generated by other applications or tools such as file in Cadence Encounter format. The system can ensure that LVS/DRC have correct mapping files that match the verified input files.

In some embodiments, a system, comprises an automated place and route tool configured to generate a layout of an integrated circuit (IC) die based on a received gate level circuit description. At least one machine readable persistent storage medium includes a first portion encoded with a first gate-level description of first and second circuit patterns to be formed on first and second integrated circuit (IC) dies, respectively, and a second portion encoded with a second gate level description of the plurality of circuit patterns received from the place and route tool. The second gate level description includes power and ground ports, and the first gate level description does not include power and ground ports. A processor-implemented first verification module is provided for comparing the first and second gate level descriptions and outputting an error report if the second gate level description has an error. The first verification module outputs a verified second gate-level description of the first and second circuit patterns.

In some embodiments, a method, comprises: providing a first gate-level description of first and second circuit patterns to be formed on first and second integrated circuit (IC) dies, respectively, wherein the first gate level description does not include power or ground ports of the IC dies; using a computer implemented place and route tool to generate a second gate level description of the plurality of circuit patterns, wherein the second gate level description includes power and ground ports of the IC dies; comparing the first and second gate level descriptions and outputting a verified second gate-level description of the first and second circuit patterns if the second gate level description has no error; using the place and route tool to generate respective layouts of the first and second IC dies based on the first gate level circuit description; and performing inter-die layout-versus-schematic verification of the layouts of the first and second IC dies based on the verified second gate-level description.

In some embodiments, a persistent machine readable storage medium is encoded with computer program code, such that, when the computer program code is executed by a processor, the processor performs a method, comprising: providing a first gate-level description of first and second circuit patterns to be formed on first and second integrated circuit (IC) dies, respectively, wherein the first gate level description does not include power or ground ports of the IC dies; using a computer implemented place and route tool to generate a second gate level description of the plurality of circuit patterns, wherein the second gate level description includes power and ground ports of the IC dies; comparing the first and second gate level descriptions and outputting a verified second gate-level description of the first and second circuit patterns if the second gate level description has no error; using the place and route tool to generate respective layouts of the first and second IC dies based on the first gate level circuit description; and performing inter-die layout-versus-schematic verification of the layouts of the first and second IC dies based on the verified second gate-level description.

The methods and system described herein may be at least partially embodied in the form of computer-implemented processes and apparatus for practicing those processes. The disclosed methods may also be at least partially embodied in the form of tangible, non-transient machine readable storage media encoded with computer program code 119. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that the computer becomes a special purpose apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
an automated place and route tool configured to generate a layout of an integrated circuit (IC) die based on a received gate level circuit description;
at least one machine readable persistent storage medium, including a first portion encoded with a first gate-level description of first and second circuit patterns to be formed on first and second integrated circuit (IC) dies, respectively, and a second portion encoded with a second gate level description of the first and second circuit patterns received from the place and route tool, wherein the second gate level description includes power and ground ports, and the first gate level description does not include power and ground ports;
a processor-implemented first verification module for comparing the first and second gate level descriptions and outputting an error report if the second gate level description has an error, the first verification module outputting a verified second gate-level description of the first and second circuit patterns.

2. The system of claim 1, wherein the first verification module includes a first parser module that receives the first and second gate level descriptions of the first and second IC dies and generates a source parsing tree having respective leaves representing each port of the first and second IC dies according to the first gate level description, and a target parsing tree having respective leaves representing each port of the first and second IC dies according to the second gate level description, wherein the first verification module compares each leaf of the target parsing tree to a corresponding leaf of the source parsing tree.

3. The system of claim 2, wherein the first parser module generates:
a source connection list based on the first gate level description, the source connection list including, for each connection between the first IC die and the second IC die, a source die, a destination die, a source port, and a destination port; and
a target connection list based on the second gate level description, the target connection list including, for each connection between the first IC die and the second IC die, a source die, a destination die, a source port, and a destination port.

4. The system of claim 2, wherein the first parser module generates and stores the following parameters in leaves of the source parsing tree:
for each port of the first die or second die identified as a source port of a connection in the source connection list, a corresponding source list destination die and source list destination port;
for each port of the first die or second die identified as a destination port of a connection in the source connection list, a corresponding source list source die and source list source port; and wherein the first parser module generates and stores the following parameters in leaves of the target parsing tree:
for each port of the first die or second die identified as a source port of a connection in the target connection list, a corresponding target list destination die and target list destination port; and
for each port of the first die or second die identified as a destination port of a connection in the target connection list, a corresponding target list source die and target list source port.

5. The system of claim 4, wherein the first parser module generates:
a source connection list based on the first gate level description, the source connection list including, for each connection between the first IC die and the second IC die, a source die, a destination die, a source port, and a destination port; and
a target connection list based on the second gate level description, the target connection list including, for each connection between the first IC die and the second IC die, a source die, a destination die, a source port, and a destination port; and
wherein the first verification module further comprises a compare module that generates and outputs the error report if, for a given leaf of the source parsing tree:
the target list source die of the corresponding leaf of the target parsing tree is different from the source list source die of the given leaf,
the target list source port of the corresponding leaf of the target parsing tree is different from the source list source port of the given leaf,
the target list destination die of the corresponding leaf of the target parsing tree is different from the source list destination die of the given leaf, or
the target list destination port of the corresponding leaf of the target parsing tree is different from the source list destination port of the given leaf.

6. The system of claim 5, further comprising a correction module that corrects an error in at least one of the group consisting of the target list source die, target list source port, target list destination port, and the target list destination die if the compare module generates an error report.

7. The system of claim 1, wherein:
the at least one storage medium includes a third portion for storing the verified second gate level description;
the at least one storage medium includes a fourth portion for storing a first microbump mapping data received from the place and route tool, the first microbump mapping data identifying connections between ports of the first die and ports of the second die, the first microbump mapping data having a different format from the verified second gate level description; and
the system further comprises a second verification module for comparing the first microbump mapping data to the verified second gate level description and outputting an error report if the first microbump mapping data has an error, the second verification module outputting verified microbump mapping data.

8. The system of claim 7, wherein the second verification module includes a second parser module that receives the verified second gate level description and the first microbump mapping data and generates a source parsing tree having respective leaves representing each port of the first and second IC dies according to the verified second gate level description, and a target parsing tree having respective leaves representing each port of the first and second IC dies according to the microbump mapping data, wherein the second verification module compares each leaf of the target parsing tree to a corresponding leaf of the source parsing tree.

9. The system of claim 8, wherein the second parser module generates:
a source connection list based on the verified second gate level description, the source connection list including, for each connection between the first IC die and the second IC die, a source die, a destination die, a source port, and a destination port; and
a target connection list based on the microbump mapping data, the target connection list including, for each connection between the first IC die and the second IC die, a source die, a destination die, a source port, and a destination port.

10. The system of claim 8, wherein the second parser module generates and stores the following parameters in leaves of the source parsing tree:
for each port of the first die or second die identified as a source port of a connection in the source connection list, a corresponding source list destination die and source list destination port;
for each port of the first die or second die identified as a destination port of a connection in the source connection list, a corresponding source list source die and source list source port; and wherein the first parser module generates and stores the following parameters in leaves of the target parsing tree:
for each port of the first die or second die identified as a source port of a connection in the target connection list, a corresponding target list destination die and target list destination port; and
for each port of the first die or second die identified as a destination port of a connection in the target connection list, a corresponding target list source die and target list source port.

11. The system of claim 10, wherein the second parser module generates:
a source connection list based on the verified second gate level description, the source connection list including, for each connection between the first IC die and the second IC die, a source die, a destination die, a source port, and a destination port; and a target connection list based on the microbump mapping data, the target connection list including, for each connection between the first IC die and the second IC die, a source die, a destination die, a source port, and a destination port; and wherein the second verification module further comprises a compare module that generates and outputs the error report if, for a given leaf of the source parsing tree:

the target list source die of the corresponding leaf of the target parsing tree is different from the source list source die of the given leaf, the target list source port of the corresponding leaf of the target parsing tree is different from the source list source port of the given leaf, the target list destination die of the corresponding leaf of the target parsing tree is different from the source list destination die of the given leaf, or the target list destination port of the corresponding leaf of the target parsing tree is different from the source list destination port of the given leaf.

12. The system of claim 11, further comprising a correction module that corrects an error in at least one of the group consisting of the target list source die, target list source port, target list destination port, and the target list destination die if the compare module generates an error report.

13. The system of claim 7, wherein:

the at least one storage medium includes a fifth portion for storing a translated microbump mapping data received from a translation tool, the translated microbump mapping data identifying connections between the ports of the first die and the ports of the second die, the translated microbump mapping data having a different format from the first microbump mapping data and from the verified second gate level description; and the system further comprises a third verification module for comparing the translated microbump mapping data to the verified second gate level description and determining whether the translated microbump mapping data has an error, the third verification module outputting verified translated microbump mapping data.

14. A method, comprising:

providing a first gate-level description of first and second circuit patterns to be formed on first and second integrated circuit (IC) dies, respectively, wherein the first gate level description does not include power or ground ports of the IC dies;

using a computer implemented place and route tool to generate a second gate level description of the first and second circuit patterns, wherein the second gate level description includes power and ground ports of the IC dies;

comparing the first and second gate level descriptions and outputting a verified second gate-level description of the first and second circuit patterns if the second gate level description has no error;

using the place and route tool to generate respective layouts of the first and second IC dies based on the first gate level circuit description; and performing inter-die layout-versus-schematic verification of the layouts of the first and second IC dies based on the verified second gate-level description.

15. The method of claim 14, further comprising:

generating a microbump mapping data using the place and route tool, the microbump mapping data identifying connections between ports of the first die and ports of the second die, the microbump mapping data having a different format from the verified second gate level description); and comparing the microbump mapping data to the verified second gate level description and outputting a verified microbump mapping data if the microbump mapping data has no error;

wherein the performing inter-die layout-versus-schematic verification is also based on the verified microbump mapping data.

16. A persistent machine readable storage medium encoded with computer program code, such that, when the computer program code is executed by a processor, the processor performs a method, comprising:

providing a first gate-level description of first and second circuit patterns to be formed on first and second integrated circuit (IC) dies, respectively, wherein the first gate level description does not include power or ground ports of the IC dies;

using a computer implemented place and route tool to generate a second gate level description of the first and second circuit patterns, wherein the second gate level description includes power and ground ports of the IC dies;

comparing the first and second gate level descriptions and outputting a verified second gate-level description of the first and second circuit patterns if the second gate level description has no error;

using the place and route tool to generate respective layouts of the first and second IC dies based on the first gate level circuit description; and performing inter-die layout-versus-schematic verification of the layouts of the first and second IC dies based on the verified second gate-level description.

17. The machine readable storage medium of claim 16, wherein the method further comprises:

generating a translated microbump mapping data using the place and route tool, the translated microbump mapping data identifying connections between ports of the first die and ports of the second die, the translated microbump mapping data having a different format from the verified second gate level description; and comparing the translated microbump mapping data to the verified second gate level description and outputting a verified translated microbump mapping data if the translated microbump mapping data has no error;

wherein the performing inter-die layout-versus-schematic verification is also based on the verified translated microbump mapping data.

18. The machine readable storage medium of claim 16, further comprising generating a source parsing tree having respective leaves representing each port of the first and second IC dies according to the first gate level description, and a target parsing tree having respective leaves representing each port of the first and second IC dies according to the second gate level description, wherein the comparing step compares each leaf of the target parsing tree to a corresponding leaf of the source parsing tree.

19. The method of claim 18, further comprising:

generating a source connection list based on the first gate level description, the source connection list including, for each connection between the first IC die and the second IC die, a source die, a destination die, a source port, and a destination port; and generating a target connection list based on the second gate level description, the target connection list including, for each connection between the first IC die and the second IC die, a source die, a destination die, a source port, and a destination port.

20. The machine readable storage medium of claim 19, wherein the source parsing tree has leaves storing the following parameters:
 for each port of the first die or second die identified as a source port of a connection in the source connection list, a corresponding source list destination die and source list destination port, and
 for each port of the first die or second die identified as a destination port of a connection in the source connection list, a corresponding source list source die and source list source port; and the target parsing tree has leaves storing the following parameters:
 for each port of the first die or second die identified as a source port of a connection in the target connection list, a corresponding target list destination die and target list destination port, and
 for each port of the first die or second die identified as a destination port of a connection in the target connection list, a corresponding target list source die and target list source port.

* * * * *